United States Patent [19]

Rao et al.

[11] 4,322,317
[45] Mar. 30, 1982

[54] COMPOSITION FOR CHALCOGENIDE ELECTRODES

[75] Inventors: Bhaskara M. L. Rao, Fanwood; Robert A. Weiss, Summit, both of N.J.

[73] Assignee: Exxon Research & Engineering Co., Florham Park, N.J.

[21] Appl. No.: 126,688

[22] Filed: Mar. 3, 1980

[51] Int. Cl.³ ............................................. H01B 1/06
[52] U.S. Cl. .................................. 252/520; 252/500; 252/518; 252/182.1; 429/194; 429/212; 429/218
[58] Field of Search ...................... 252/182.1, 518, 520, 252/511, 500, 521; 429/218, 194, 212, 249, 251, 254; 260/23.5 A; 525/344

[56] References Cited

U.S. PATENT DOCUMENTS

| | | | |
|---|---|---|---|
| 3,791,867 | 2/1974 | Broadhead et al. | 136/6 |
| 3,864,167 | 2/1975 | Broadhead et al. | 136/6 LN |
| 3,925,098 | 12/1975 | Saunders et al. | 136/6 LF |
| 3,988,164 | 10/1976 | Liang et al. | 429/218 X |
| 4,175,167 | 11/1979 | van Lier | 429/212 |
| 4,203,861 | 5/1980 | Thorp et al. | 252/520 |
| 4,228,228 | 10/1980 | Beauchamp | 429/218 |
| 4,287,269 | 9/1981 | Coetzer et al. | 429/218 |

*Primary Examiner*—Joseph L. Schofer
*Assistant Examiner*—J. L. Barr
*Attorney, Agent, or Firm*—Robert S. Salzman

[57] ABSTRACT

The present invention is directed to a novel method of fabricating and composition for chalcogenide cathode-active electrodes. The method comprises the steps of:

(a) combining the cathode-active material in particulate form with about 0.1 to about 10 percent by weight of a neutralized sulfonated ionomer, based on the total weight of the cathode-active material and the ionomer, and about 10 to about 90 percent by weight of solvent, based on the total weight of the cathode-active material, ionomer and solvent, wherein said solvent is a cosolvent system which includes one or more solvents selected from the group consisting of normal and aromatic hydrocarbons and one or more solvents selected from the group consisting of alcohols, amines, amides, nitriles, nitro-compounds, lactones and acetols;

(b) forming the desired electrode configuration with the resulting mixture; and (c) drying the formed electrode so as to volatilize the solvent.

The composition consists essentially of (a) a chalcogenide material in a particulate form consisting of one or more compounds selected from a group consisting of the sulfides, selenides and tellurides of titanium, zirconium, hafnium, niobium, tantalum, molybdenum and vanadium; and (b) less than about 10 weight percent of a neutralized sulfonated elastomeric polymer having less than about 6 mole percent neutralized sulfonate groups per 100 grams of said polymer.

3 Claims, 1 Drawing Figure

COMPOSITION FOR CHALCOGENIDE ELECTRODES

BACKGROUND OF THE INVENTION

1. Field of the Invention

The present invention relates to a method of fabricating and composition for chalcogenide electrodes and, more particularly, to the fabrication of such electrodes using ionomeric binder materials.

2. Description of the Prior Art

There has been considerable interest in recent years in developing high energy density batteries or voltaic cells. Among the systems being investigated are those employing non-aqueous liquid, fused or solid electrolytes, with light-weight metals, such as alkali metals as anodes, and with cathodes containing metal chalcogenide compounds. Such systems are described, for example, in U.S. Pat. Nos. 3,988,164; 3,925,098; 3,864,167; and 3,791,867.

Although significant developments have been made concerning the fabrication of cells such as those described above, one of the common problems that researches find in developing chalcogenide cathode systems is the manner in which the cathode-active material is contained within the cathode structure. For example, typically, the chalcogenide cathode-active materials are produced in particulate form and must be pelletized or chemically bound up to form a cathode structure configuration. A common technique which has been used to bind up the cathode-active material involves the use of Teflon as the principal or sole binding agent.

While the Teflon binding of chalcogenide cathode-active material is now an acceptable means of forming a cathode structure, it is, nonetheless, a cumbersome, multi-step procedure which involves substantial expenditure of labor. Thus, the present state of the art is lacking in a simple fabrication technique for producing chalcogenide cathode-active structures.

SUMMARY OF THE INVENTION

The present invention is directed to a novel method and composition for the fabrication of chalcogenide cathode-active electrodes. The method comprises the steps of:

(a) combining the cathode-active material in particulate form with about 0.1 to about 10 percent by weight of a neutralized sulfonated elastomeric polymer having less than 6 mole percent sulfonate groups per 100 grams of said sulfonated polymer, based on the total weight of the cathode-active material and the sulfonated polymer and about 10 to about 90 percent by weight of solvent, based on the total weight of the cathode-active material, said sulfonated polymer, and solvent, wherein said solvent is a cosolvent system which includes one or more solvents selected from the group consisting of normal and aromatic hydrocarbons and one or more solvents selected from the group consisting of alcohols, amines, amides, nitriles, nitro-compounds, lactones and acetals;

(b) forming the desired electrode configuration with the resulting mixture; and (c) drying the formed electrode so as to volatilize the solvent.

The composition of the electrode formed by the above method consists of:

(a) a chalcogenide material in a particulate form consisting of one or more compounds selected from a group consisting of the sulfides, selenides, and tellurides of titanium, zirconium, hafnium, niobium, tantalum, molybdenum and vanadium; and (b) less than about 10 weight percent of a neutralized sulfonated elastomeric polymer having less than about 6 mole percent neutralized sulfonate groups per 100 grams of said polymer.

DETAILED DESCRIPTION OF THE INVENTION

Figure 1:
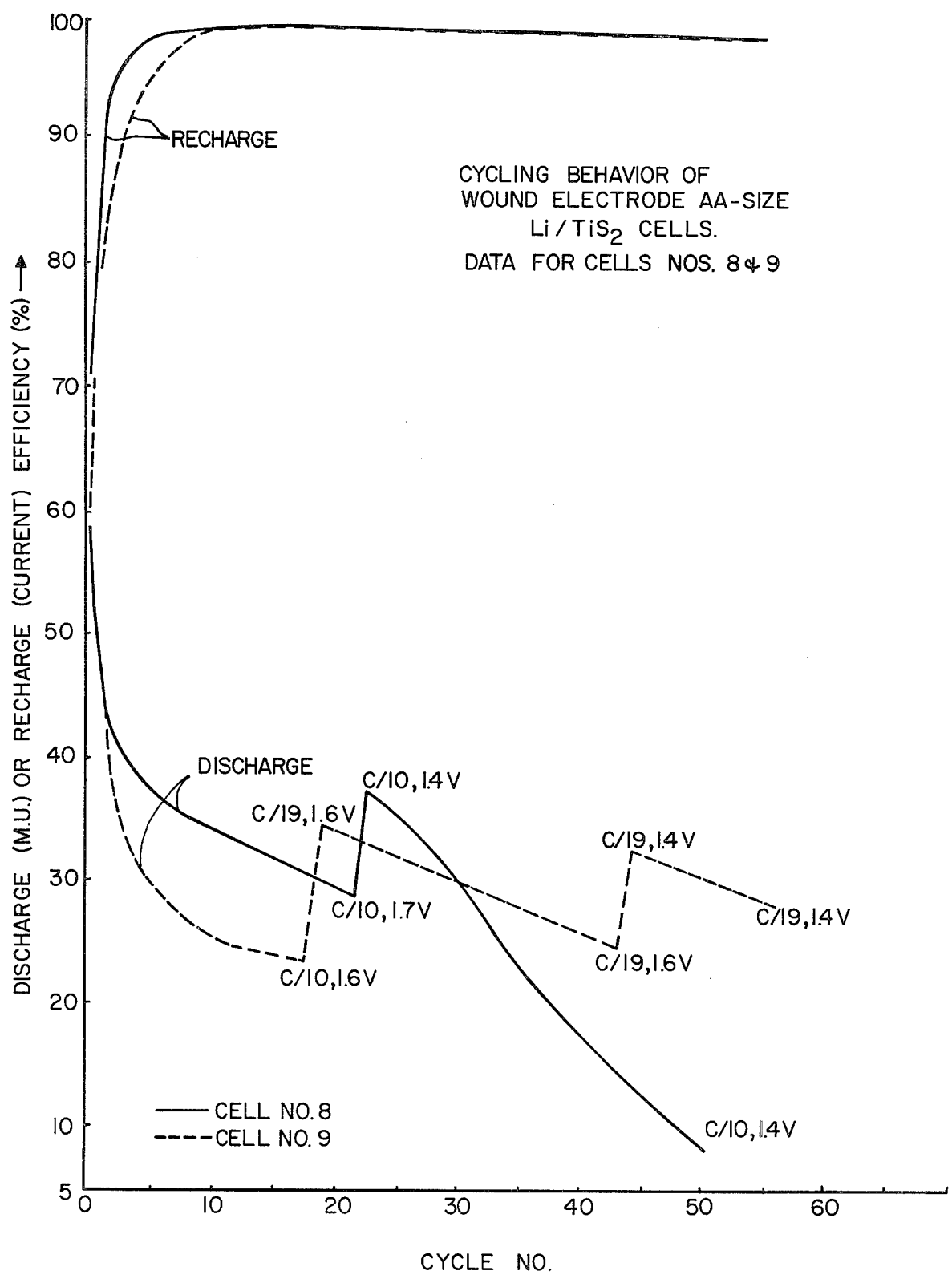
FIG. 1 illustrates graphically the cycling behavior of a wound electrode "AA" size lithium anode, titanium disulfide cathode cell containing a cathode prepared in accordance with the present invention.

The present state of the art for fabrication of chalcogenide cathode-active electrodes involves several time-consuming, sensitive steps. For example, in the preparation of a one-cell electrode, the steps include Teflonation, which is a procedure involving the mixing of an aqueous colloidal Teflon emulsion with a polypropylene powder and the desired chalcogenide powder, followed by methanol addition to coagulate the Teflon, cleaning and drying the Teflonated chalcogenide cathode-active material, pelletizing the dry mix, loading the dry mix in cans and curing the cans so as to solidify the electrode structure. In the preparation of chalcogenide cathode-active electrodes for prismatic cells, the steps include the above-mentioned Teflonation, the cleaning and drying of the Teflonated cathode-active material, and rolling of the dry mix, loading the resulting rolled material on a grid, and hot sintering to form the solid structure. In each of these methods of fabrication, sensitivity arises in the cleaning and drying of the Teflonated cathode-active material because extreme caution must be taken to assure that no residual sulfur and/or hydrogen sulfide as an impurity remains. Otherwise, the presence of the sulfur and/or hydrogen sulfide becomes problematic in the hot sintering or curing step because these impurities are liberated as toxic gases and additionally have been shown to be detrimental to subsequent cell performance. Further, the above-described fabrication techniques are not readily adaptable to the production of flexible electrodes suitable for high-rate wound electrode cell structures. Then, it has been recognized that even if one is willing to employ the multi-step process of Teflon binding the chalcogenide cathode material, the resultant product cannot be used in a universal manner with respect to the choice of electrode geometry.

It has now been discovered that a simple method of fabricating chalcogenide cathode-active electrodes may be employed so as to avoid the shortcomings of the Teflon binding technique and so as to produce a product which may be wound into spiral battery configurations or virtually any other geometry, as desired.

Upon initial consideration, it might be assumed that many binding materials as alternatives to Teflon would produce these desirable results. However, although there are a large number of natural and synthetic polymers available as binders for electrode preparation, their selection for specific electrode preparation, i.e., for the fabrication of chalcogenide cathode-active electrodes, is not obvious to the artisan due to the many factors which influence the results obtained with any particular binder. Among these factors are: (1) solubility of the binder in the electrolyte of the battery product (for example, chalcogenide cathode-active electrode batteries involve the use of very specific types of non-aqueous electrolytes); (2) chemical stability of the binder at the electrode potential (many cells are operated at different electrode potentials); (3) binder concentration (workable concentrations may result in low performance for given cathode materials); (4) ease of uniform distribution or mixing of the binder with the electro-active material of the electrode (i.e., solvent casting, powder mixing, precipitation, etc.); (5) the desired mixing and finishing steps needed to obtain the end product (i.e., pressing, sintering, curing, drying, polymerization, etc.); (6) safety; and (7) availability and cost. Thus, selection of binders for electrodes of the chalcogenide type is difficult because of these factors and especially the solubility and chemical reactivity aspects which impose severe restrictions upon the cell performance.

It has now been discovered that ionomers, that is, neutralized sulfonated ionomers, have the unusual ability to produce high performance chalcogenide cathode-active electrodes. These ionomers are insoluble in many of the organic electrolyte solutions of choice for cathodes employing chalcogenide materials, and, additionally, lend themselves to the use of readily available, inexpensive solvents, and further are useful in simple fabrication procedures which eliminate most of the steps involved in fabrication using Teflon binding.

The first step in the method of the present invention involves mixing the desired ingredients. These ingredients include, but are not limited to, the chalcogenide cathode-active material, the ionomer and the solvent. The chalcogenide cathode-active material may be any of the known chalcogenide materials, as well as mixtures thereof, and includes, but should not be limited to, one or more of the chalcogenide compounds selected from the group consisting of the sulfides, the selenides, and the tellurides of titanium, zirconium, hafnium, niobium, tantalum, molybdenum and vanadium. In general, such chalcogenides contain about 1.8 to about 3.2 atoms of the chalcogen per metal atom. Advantageously, these chalcogenides are the sulfides, the selenides, and the tellurides of one or more metals selected from the mentioned group and desirably one or more metals selected from titanium, molybdenum and vanadium. Preferred are the titanium chalcogenides. Among the chalcogens employed in the chalcogenides used as the cathode-active materials are, as mentioned, sulfur, selenium, and tellurium. Of these, sulfur and selenium are desired, and sulfur is preferred. Also, among the chalcogenides, those which contain about 1.8 to about 2.1 atoms of chalcogen per metal atom, commonly referred to as the dichalcogenides, are preferred.

Examples of cathode-active materials which may be useful and which are selected from the above-mentioned chalcogenides are titanium disulfide, zirconium disulfide, hafnium disulfide, niobium triselenide, tantalum disulfide, molybdenum trisulfide, vanadium disulfide, vanadium diselenide and vanadium ditelluride. Also included are the chalcogenides having more than one of the mentioned metals, e.g., $V_{0.25}Ti_{0.75}S_{2.0}$. Also included are those chalcogenides having metals other than those described above included, e.g., vanadium iron disulfide. Lastly, it should be noted that while the trichalcogenides and dichalcogenides are described, the present invention is not limited thereto and may include, for example, the pentachalcogenides and the like.

The water-insoluble ionomer employed in the electrode fabrication technique of the present invention is any ionomer, or mixture of ionomers known as the neutralized sulfonated ionomers. Typical neutralized sulfonated ionomers are sulfonated EPDM terpolymers, sulfonated polystyrene and sulfonated Butyl rubber. These are sometimes referred to as ionic plastics and elastomers and contain sulfonate groups appended to at least some of the unsaturated groups of ethylene-propylene diene type terpolymers. The ionic polymers are those containing less than roughly about 6 mol percent of sulfonate groups and more preferred, about one mol percent of sulfonate group on the ionic elastomer as well as other amounts of sulfonate groups. These ionomers are now known in the polymeric elastomeric art and their fabrication is well publicized as illustrated, for example, by U.S. Pat. Nos. 3,642,728, 3,836,511, and 4,153,588. In the case of EPDM terpolymers, these ionic elastomers or ionomers may contain a majority amount or a minority amount of ethylene based on the total weight of all of the monomers which make up the terpolymer. Likewise, the terpolymer may include a minority or a majority amount of propylene based on the total weight of the monomers and the terpolymer. Also, the diene monomer employed may be any of those which form adequate terpolymers with ethylene and propylene and are capable of being formed into neutralized sulfonated ionomers and include, for example, ethylidene norbornene, such as 5-ethylidene-2-norbornene.

The elastomeric polymers of the present invention are derived from synthetic and natural polymers having olefinic unsaturation sites, wherein the polymer has from about 0.1 to about 10.0 mole% olefinic unsaturation. The unsaturation sites can be in the polymer backbone, pendant therefrom or cyclic.

In particular, the unsaturated polymers of this present invention include low unsaturated polymers such as butyl rubber, halo-butyl or EPDM terpolymers. Additionally, other unsaturated polymers contemplated are partially hydrogenated isoprene, partially hydrogenated polybutadiene, or an isoprene-styrene random copolymer.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 218 (Exxon Chemical Co.), having a viscosity average molecular weight of about 450,000, a mole % unsaturation of about 1.5% and a Mooney viscosity of about 55° at 260° F. at 8 minutes.

Halogenated butyl rubber is commercially available and may be prepared by halogenating Butyl rubber in a solution containing between 1 to 60% by weight of Butyl rubber in a substantially inert $C_5$-$C_8$ hydrocarbon solvent such as pentane, hexane, heptane, etc. and contacting this Butyl rubber cement with a halogen gas for a period of about 25 minutes, whereby halogenated Butyl rubber and a hydrogen halide are formed, the copolymer containing up to one halogen atom per double bond in the copolymer. The preparation of halogenated Butyl rubber is old in the art, see e.g. U.S. Pat. No. 3,099,644 which is incorporated herein by reference. This invention is not intended to be limited in any way by the manner in which Butyl rubber is halogenated, and both chlorinated and brominated Butyl rubber are suitable for use in this invention.

Illustrative of halogenated Butyl rubbers is Exxon Butyl HT-10-66 (a chlorinated Butyl rubber containing about 1.3 wt.% chlorine, having about 1.7 mole % unsaturation and a viscosity average molecular weight of about 357,000).

Low molecular weight Butyl rubbers, i.e. Butyl rubbers having a viscosity average molecular weight of about 5,000 to 85,000 and a mole % unsaturation of about 3 to about 4% may be sulfonated by the process of this invention. Preferably, these polymers have a viscosity average molecular weight of about 25,000 to about 60,000.

The term "EPDM" is used in the sense of its definition as found in ASTM D-1418-64 and is intended to mean a terpolymer containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred terpolymers contain about 40 to about 80 wt.% ethylene and about 2 to about 10 wt.% of a diene monomer, the balance of the polymer being propylene. More preferably, the polymer contains about 45 to about 75 wt.% ethylene, e.g. 50 wt.% and about 2.6 to about 10 wt.% diene monomer, e.g. 5.0 wt.%. The diene monomer is preferably a non-conjugated diene. The $\overline{M}n$ of the terpolymer is preferably about 10,000 to about 200,000; more preferably about 15,000 to about 100,000, most preferably about 20,000 to about 60,000. The Mooney viscosity of the terpolymer at (1+8) minutes at 212° F. is preferably 5 to 90, more preferably 10 to 60 and most preferably 15 to 50, e.g. 40. The $\overline{M}v$ of the EPDM is preferably below about 350,000; more preferably below about 300,000, e.g. 270,000. The Mw of the EPDM is preferably below about 500,000 and more preferably below about 350,000, e.g. 343,000.

Illustrative of these non-conjugated diene monomers which may be used in the EPDM terpolymer are (1,4-hexadiene, dicyclopentadiene, ethylidene norbornene, propylidene norbornene and methyl tetrahydroindene).

A typical EPDM is Vistalon 2504 (Exxon Chemical Co.) a terpolymer having a Mooney viscosity at (ML, 1+8, 212° F.) of about 40 and having 50 wt.% of ethylene, 45 wt.% of propylene, and 5.0 wt.% of 5-ethylidene-2-norbornene with an $\overline{M}n$ of about 47,000, an $\overline{M}v$ of about 145,000 and an Mw of about 174,000. The Vistalon 2504 can be reprocessed through an extruder until a 20 Mooney value has been achieved.

Another EPDM terpolymer, Vistalon 2504-20 is derived from Vistalon 2504 (Exxon Chemical Co.) by a controlled extrusion process, wherein the resultant Mooney viscosity at 212° F. is about 20. The $\overline{M}n$ of Vistalon 2504-20 is about 26,000, and $\overline{M}v$ is about 90,000 and the $\overline{M}w$ is about 125,000.

Vistalon 3708 (Exxon Chemical Co.) is a terpolymer having a Mooney viscosity (ML, 1+8, 260° F.) of about 45-55 and having about 65 wt.% of ethylene, about 3.3 wt.% of 5-ethylidene-2-norbornene; and about 31.7 wt.% of propylene with an Mn of about 53,000, an Mw of about 343,000 and an Mv of about 27,000.

Vistalon 6505 (Exxon Chemical Co.) is a terpolymer having a Mooney viscosity (ML, 1+8, 260° F.) of about 45-55 and having about 53 wt.% of ethylene, about 9.0 wt.% of 5-ethylidene-2-norbornene and about 38 wt.% of propylene.

Nordel 1320 (DuPont) is another EPDM terpolymer having a Mooney viscosity (ML, 1+8, 212° F.) of about 25 and having about 53 wt.% of ethylene, about 3.5 wt.% of 1,4-hexadiene and about 43.5 wt.% of propylene. In general, about 0.1 to about 10 percent by weight of ionomer is used based on the total weight of the ionomer and the cathode-active material, and preferably about 0.5 to about 5 weight percent is used.

The solvent which is employed in the fabrication technique of the present invention is a cosolvent system which includes one or more solvents selected from the group consisting of normal and branched chain aliphatic and aromatic hydrocarbons and one or more solvents selected from the group consisting of alcohols, amines, amides, nitriles, nitrocompounds, lactones and acetols. Of these, two solvent systems such as hexane-methanol, heptane-methanol and xylene-hexanol are preferred. In general, about 10 percent by weight of solvent up to about 90 percent by weight of solvent based on the total weight of the cathode-active material, the ionomer and the solvent, should be employed. Preferably about 20 to about 80 percent by weight of solvent may be used.

After the above-described ingredients are mixed together, the desired electrode geometric configuration is formed. This may be accomplished by any molding or casting or spreading or rolling technique which will produce the desired geometric configuration. Since the mixing of the above-mentioned materials results in a paste-like material which may be relatively thick and sculpturable or relatively thin and pourable, depending upon the amount of solvent employed, any type of geometric configuration forming may be employed.

The next step involves drying the electrode structure so as to form a relatively rigid electrode. Drying may be achieved at room temperature, although accelerated drying by application of heat is desirable. For example, the resulting electrode may be dried at temperatures of about 20° C. to about 50° C. Lastly, as mentioned, the final cathode structure may be shaped or reshaped into any desired structure, and, for example, may be rolled or coiled into a spiral or wound battery configuration, a structure that has heretofore been difficult to achieve with the Teflon bound chalcogenide cathode-active materials.

The present invention is more fully understood by the following examples and description of the drawing. However, these examples are presented for illustrative purposes only, and the invention should not be construed to be limited thereto.

EXAMPLE 1

A titanium disulfide cathode structure was made in accordance with the method of the present invention employing a neutralized sulfonate ionomer of the following composition:
Ethylene-Propylene-Diene Monomer (EPDM) Terpolymer Base Structure having:
55% ethylene monomer
40% propylene monomer
5% 5-ethylidene-2-norbornene.

Mooney viscosity of 20 (ML 1+8 at 212° F.) and the ionomer has 30 millimole equivalents zinc sulfonate per 100 grams of sulfonated ionomer.

The electrode fabrication involved the following:

A 2 w/o solution of the TP-303 ionomer is dissolved in a 95:5::heptane:methanol medium. To a 1 gram sample of $TiS_2$ powder, 2 grams of the ionomer solution are added and made into a paste with 1-2 ml heptane addition. The paste is spread on a 1"×6" aluminum grid and solvent is allowed to evaporate.

The electrode formed by this procedure contained 4 w/o binder, and the $TiS_2$ capacity density was ~6mAh/cm². The electrode was sectioned into 1"×1" slabs, and tested in Li/$TiS_2$ cell in parallel plate prismatic configuration in the usual manner. The cell electrolyte was 3.4 M LiSCN in Dioxolane:DME::92:8 v/o.

The test electrode cell operated at an average material efficiency of ~75%, amounting to figure-of-merit of $TiS_2$ of <8 in ten rechargeable cycles carried out at 1.5 mA/cm² discharge to 1.4 v and 0.4 mA/cm² recharge to 2.6 v, under cathode half-cell voltage control. Figure-of-merit is defined as the ratio of the cumulative discharge capacity to the initial capacity of the electrode.

EXAMPLES 2-26

Twenty-five sets of cells were prepared using the electrode fabrication of Example 1 to produce rectalinear sheets 1.5"×3", about 0.02 to about 0.025 inches thick and containing about 1 to about 1.5 grams of $TiS_2$. These were sandwiched with anodes of the same rectalinear shape of about 0.012 to about 0.15 inches thick and containing about 0.02 to about 0.025 grams of lithium, using appropriate separators. These sandwiches were wound into "spiral" cells and placed in 0.5" diameter propylene tubes having elongated thin ends. Positive and negative terminals which had been affixed to their respective electrode sheets during sandwiching were bent over the tapered ends of the tubes. Stainless steel caps were force fitted over the ends of the tubes so as to be in electrical contact with the terminal tabs. A septum was provided in the cell caps for post filling of the cell with elyte solution employing a partial vacuum. The cells were sealed at the cap-tube joints with epoxy.

These cells discharged at 75 to 80% M.U. at 10 hour rate on first discharge. (M.U. is Material Utilization and is the percentage of cell output divided by theoretical output upon discharge, i.e., (cell output × 100)/theoretical cell output.)

Additional testing was performed and results are given in Table 1, which also specifies elytes and separators employed for each cell.

FIG. 1 illustrates cycling behavior of wound electrode cells, Examples 8 and 9 of Table 1.

TABLE 1

SUMMARY OF WOUND-ELECTRODE Li/$TiS_2$ CELLS
SIZE: AH (1.5" × 3" ELECTRODES)

| Example No. | Cell No. | Elyte[1] | $TiS_2$ MAH | Separator[2] | Discharge[3] Hr-Rate | Cut-off (Volts) | M.U. % | to Cycle # | M.U. % | to Cycle # | FADE %/Cycle | Observations |
|---|---|---|---|---|---|---|---|---|---|---|---|---|
| 2 | 1-2 | A | 200 | 1 | — | — | — | | — | | | Shorted during Assembly |
| 3 | 3,4,7,12 | A | 200 | 1 | — | — | — | | — | | 23 | Leaked during test |
| 4 | 5 | A | 232 | 1 | 11.6 | 1.4 | 78 | 1 | 32 | 2 | 23 | <50% Recharge |
| 5 | 6 | A | 271 | 1 | 10 | 1.4 | 76 | 1 | 8 | 5 | 13.6 | <50% Recharge |
| 6 | 8 | A | 384 | 2 | 19 | 1.7 | 59 | 1 | 37 | 3 | 7.3 | 70 to 90% Recharge |
| 7 | | A | | 2 | | 1.7 | 37 | 4 | 29 | 21 | 0.47 | >98% Recharge |
| 8 | | A | | 2 | | 1.4 | 37 | 22 | 17 | 40 | 1.1 | |
| 9 | 9 | A | 287 | 2 | 10 | 1.6 | 69 | 1 | 35 | 3 | 11.3 | 70 to 90% Recharge |
| 10 | | A | | 2 | 10 | 1.6 | 33 | 4 | 24 | 17 | 0.7 | >98% Recharge |
| 11 | | A | | 2 | 19 | 1.6 | 35 | 18 | 25 | 44 | 0.38 | >98% Recharge |
| 12 | | A | | 2 | 19 | 1.4 | 33 | 45 | 28 | 55 | 0.5 | >98% Recharge |
| 13 | 10 | A | 229 | 1 | 10 | 1.6 | 68 | 1 | 7.5 | 4 | 15 | <50% Recharge |
| 14 | 11 | A | 239 | 3 | 10 | 1.6 | 57 | 1 | 24 | 6 | 5.5 | 70 to 90% Recharge |
| 15 | 13 | A | 209 | 1 | 10 | 1.6 | 72 | 1 | 14 | 6 | 9.6 | <60% Recharge |
| 16 | 14 | A | 450 | 3 | 9 | 1.6 | 69 | 1 | 20 | 3 | 16.3 | 60 to 90% Recharge |
| 17 | | A | | 3 | 18 | 1.6 | 53 | 4 | 14 | 19 | 2.3 | 80 to 90% Recharge |
| 18 | 15 | A | 331 | 3 | 10 | 1.6 | 64 | 1 | 36 | 4 | 7 | 70 to 90% Recharge |
| 19 | 16 | A | 334 | 3 | 10 | 1.6 | 81 | 1 | 42 | 4 | 9.8 | 70 to 90% Recharge |
| 20 | | A | | 3 | | 1.4 | 65 | 5 | 49 | 13 | 2 | 70 to 90% Recharge |
| 21 | | | | 3 | 20 | 1.4 | 71 | 14 | | | | |
| 22 | 17 | B | 441 | 3 | 10 | 1.6 | 43.6 | 1 | 19.3 | 5 | 4.8 | 75 to 85% Recharge |
| 23 | 18 | B | 363 | 3 | 10 | 1.6 | 69 | 1 | 30 | 5 | 7.8 | 75 to 85% Recharge |
| 24 | | B | | 3 | | | 30 | 6 | 6 | 18 | 2 | 85 to 90% |

TABLE 1-continued

SUMMARY OF WOUND-ELECTRODE Li/TiS$_2$ CELLS
SIZE: AH (1.5" × 3" ELECTRODES)

| Example No. | Cell No. | Elyte[1] | TiS$_2$ MAH | Separator[2] | Hr-Rate | Cut-off (Volts) | Discharge[3] M.U. % to Cycle # | | From →To M.U. % to Cycle # | | FADE %/Cycle | Observations |
|---|---|---|---|---|---|---|---|---|---|---|---|---|
| 25 | 19 | B | 405 | 3 | 10 | 1.6 | 80 | 1 | 43 | 7 | 5.3 | Recharge |
| 26 |   | B |   | 3 | 20 | 1.6 | 61 | 8 |   |   |   |   |

[1]Elyte: Electrolyte A. 3.4M LiSCN Dioxolane:DME 92:8 Volume percent; B. 0.5M LiF Dioxolane
[2]Separator: 1. Crown-Zellerbach 0.008" thick; 2. 0.005" fiberglass; 3. Filter paper

What is claimed is:

1. An elastomeric composition for chalcogenide electrodes consisting essentially of:
    (a) a chalcogenide material in a particulate form consisting of one or more compounds selected from a group consisting of the sulfides, selenides and tellurides of titanium, zirconium, hafnium, niobium, tantalum, molybdenum, and vanadium; and
    (b) less than about 10 weight percent of a neutralized sulfonated elastomeric polymer formed from an EPDM terpolymer, polystyrene or a butyl rubber and having less than about 6 mole percent neutralized sulfonate groups per 100 grams of said polymer.

2. The elastomeric composition of claim 1, wherein said chalcogenide material is titanium disulfide.

3. The elastomeric composition of claim 1, consisting essentially of about 0.5 to about 5 percent by weight of said neutralized sulfonated polymer, based on the total weight of the chalcogenide material, and about 20 to about 80 percent by weight of a solvent, based on the total weight of the chalcogenide material, the polymer and the solvent, said solvent being a cosolvent system including one or more solvents selected from a group consisting of normal and aromatic hydrocarbons and one or more solvents selected from a group consisting of alcohols, amines, amides, nitrides, nitro-compounds, lactones and acetols.

* * * * *